(12) United States Patent
Arnold

(10) Patent No.: US 6,437,826 B1
(45) Date of Patent: Aug. 20, 2002

(54) DIGITAL VIDEO TELECONFERENCING CAMERA SYSTEM HAVING A BASE

(75) Inventor: Thomas A. Arnold, Aliso Viejo, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/110,812

(22) Filed: Jul. 6, 1998

(51) Int. Cl.[7] ................ H04N 5/225; H04N 7/00; H04N 7/14
(52) U.S. Cl. ............ 348/373; 348/14.16; 348/552; D14/317; D16/202; D16/208; 248/187.1; 248/918; 396/419
(58) Field of Search ................. D14/314, 317, D14/239, 251; D16/200, 202, 208, 237, 242; 348/14.08, 14.16, 207, 373–376; 358/906, 909.1; 248/917, 918–923, 181.1, 181.2, 182.1, 183.1, 186.1, 186.2, 187.1, 346.01, 346.03, 346.06; 396/419, 428; H04N 7/14, 5/225

(56) References Cited

U.S. PATENT DOCUMENTS

| | | | | | |
|---|---|---|---|---|---|
| 4,016,583 A | * | 4/1977 | Yeates | .................. | 396/420 |
| 5,322,255 A | * | 6/1994 | Garrett | .................. | 248/299.1 |
| 5,557,663 A | * | 9/1996 | Huang | .................. | 348/14.01 |
| 5,790,910 A | * | 8/1998 | Haskin | .................. | 396/427 |
| 5,871,186 A | * | 2/1999 | Bothe | .................. | 248/181.1 |
| 5,911,393 A | * | 6/1999 | Reuter | .................. | 248/181.1 |
| 5,934,640 A | * | 8/1999 | Hall | .................. | 248/371 |
| 6,137,526 A | * | 10/2000 | Kakii | .................. | 348/14.16 |
| 6,141,052 A | * | 10/2000 | Fukumitsu | .................. | 348/373 |
| 6,209,830 B1 | * | 4/2001 | Brotz | .................. | 248/187.1 |

* cited by examiner

*Primary Examiner*—Ngoc-Yen Vu
(74) *Attorney, Agent, or Firm*—Thomas, Kayden, Horstemeyer & Risley LLP

(57) ABSTRACT

Apparatus for positioning a video teleconferencing camera including a base member having a flat metal base portion and a vertically depending metal arm, the base portion and arm being covered with an elastomeric material, the elastomeric material being shaped to form a socket on the arm which receives a ball member extending from in camera body to form a ball-and-socket connection.

13 Claims, 3 Drawing Sheets

DIGITAL VIDEO TELECONFERENCING CAMERA SYSTEM HAVING A BASE

BACKGROUND OF THE INVENTION

1. Field of the Invention

The present invention relates generally to digital image processing, and more specifically pertains to miniature digital video teleconferencing imaging systems.

2. Description of Related Art

Video teleconferencing cameras for personal computers are becoming very common. However, prior art designs have failed to locate the camera lens close to the user's eye level. Typically, the camera is either too high and looking above the user's forehead, or too low and looking up the user's nose.

It is ergonomically correct for the user to look down at the computer monitor screen, so that the user's eyeballs are approximately level with the top of the monitor screen or at a slight distance, such as one inch, below the top. However, conventional teleconferencing cameras are generally designed to be seated on the top of a computer monitor, which means that they are placed too high. For that reason, the typical conventional cameras are designed with a very low height profile in order to place the camera lens as low as possible, for example, as shown in FIG. 1.

Other conventional cameras have the lens mounted at the end of an elongated, flexible shaft, which gives them the appearance of an eye on a very long neck, as shown in FIG. 2. This structure allows manual adjustment of the lens location with a high degree of freedom, but the design may obscure the computer monitor screen.

Therefore, there is a need for a digital video teleconferencing camera for desktop or portable computers which has a simple and aesthetically pleasing design. Moreover, there is a need for small, low cost, digital teleconferencing cameras for consumers, which are inexpensive, suitable for mass production, durable, ergonomically comfortable, and which provide ease of handling a wide range of uses, and a variety of mounting options.

OBJECTS AND SUMMARY OF THE INVENTION

It is therefore an object of the present invention to improve video cameras.

It is a primary object of the present invention to overcome the aforementioned shortcomings associated with the prior art;

Another object of this invention is to provide a small video camera for desktop or portable computers in which the camera lens is level with the user's eyes;

Yet another object of this invention is to provide a small video camera which will rest securely on a computer monitor and which is suitable for mass production and use in a variety of consumer imaging applications.

These, as well as additional objects and advantages of the present invention, are achieved by a video teleconference camera apparatus comprising a base member and a camera body. The base member has a flat base portion and a vertically depending arm with a socket formed on the arm. The camera body has a rear surface with a ball member extending therefrom, the ball member being sized to form a ball-and-socket connection with the socket located on the arm. The base portion is adapted to rest on the top surface of a computer monitor and is of sufficient weight to maintain the camera body disposed in front of the monitor. The camera body is therefore positioned more closely to user eye level, while the ball and socket mechanism permits pointing the camera in a desired direction, for example, to maintain eye-to-eye contact.

BRIEF DESCRIPTION OF THE DRAWINGS

The objects and features of the present invention are set forth with particularity in the appended claims. The present invention, both as to its organization and manner of operation, together with further objects and advantages, may best be understood by reference to the following description, taken in connection with the accompanying drawings, wherein:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide an inexpensive, readily manufactured and easily used video camera.

A video teleconferencing camera according to the preferred embodiment is illustrated in FIGS. 3–6. The two major components of the preferred embodiment are a camera 11 and a base 25. The camera 11 includes a body 13 and a lens enclosure 15. The camera 11 is preferably a plastic molded enclosure containing conventional camera components; e.g., lens, focus ring, microphone, and all the electronics.

Figure 1:
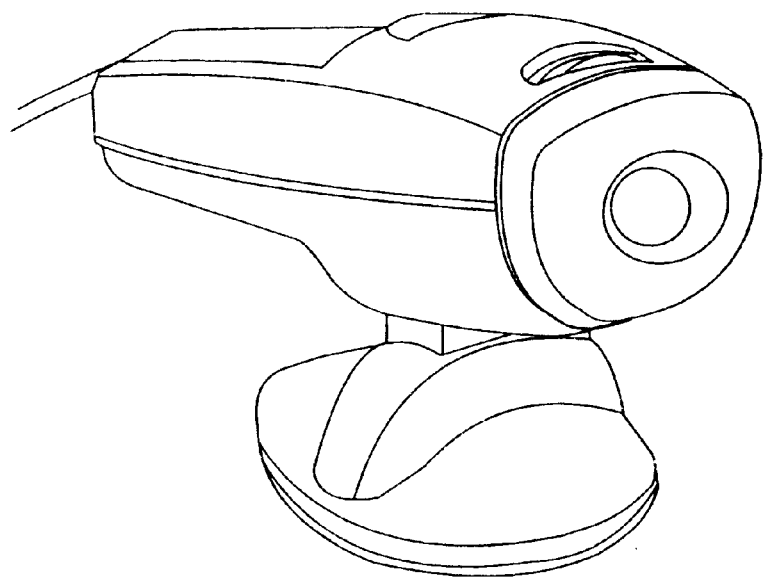
FIG. 1 is a perspective view of a prior art video camera.
Figure 2:
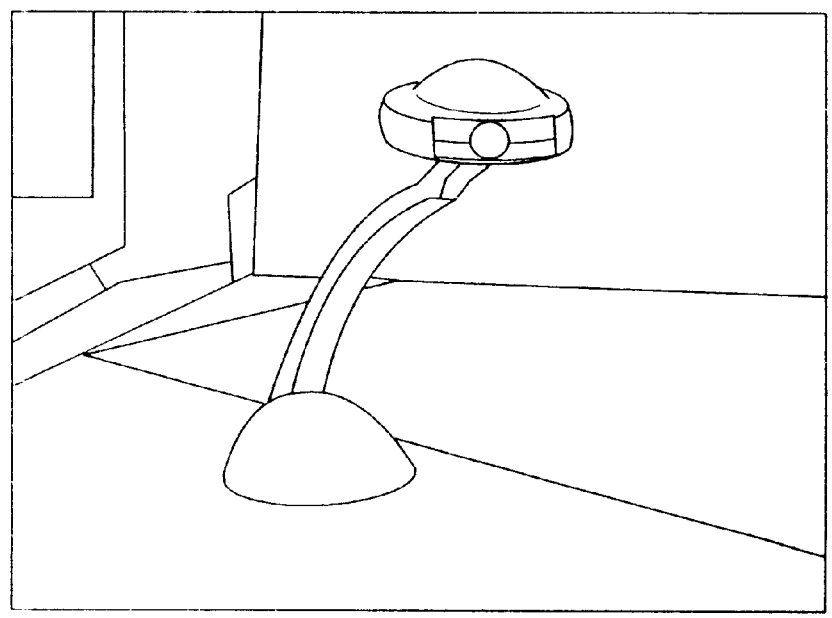
FIG. 2 is a perspective view of a prior art video camera.
Figure 3:
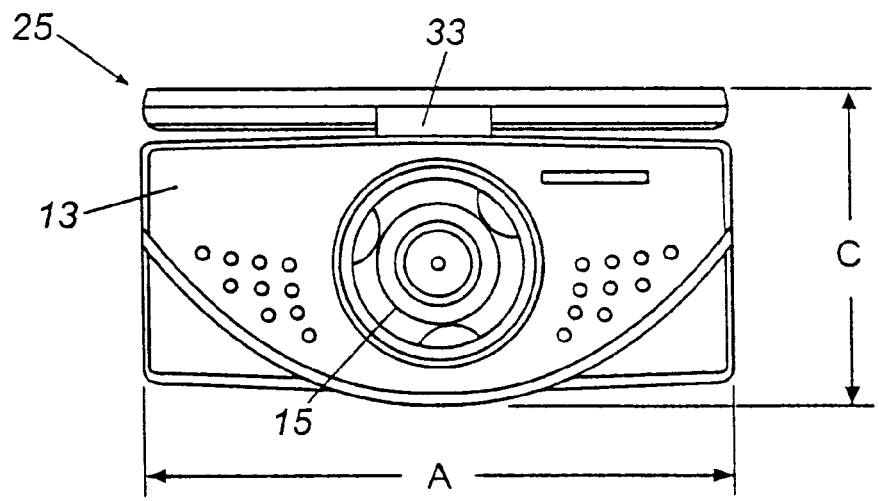
FIG. 3 is a front view of a miniature video teleconferencing camera in accordance with the preferred embodiment of the present invention.
Figure 4:
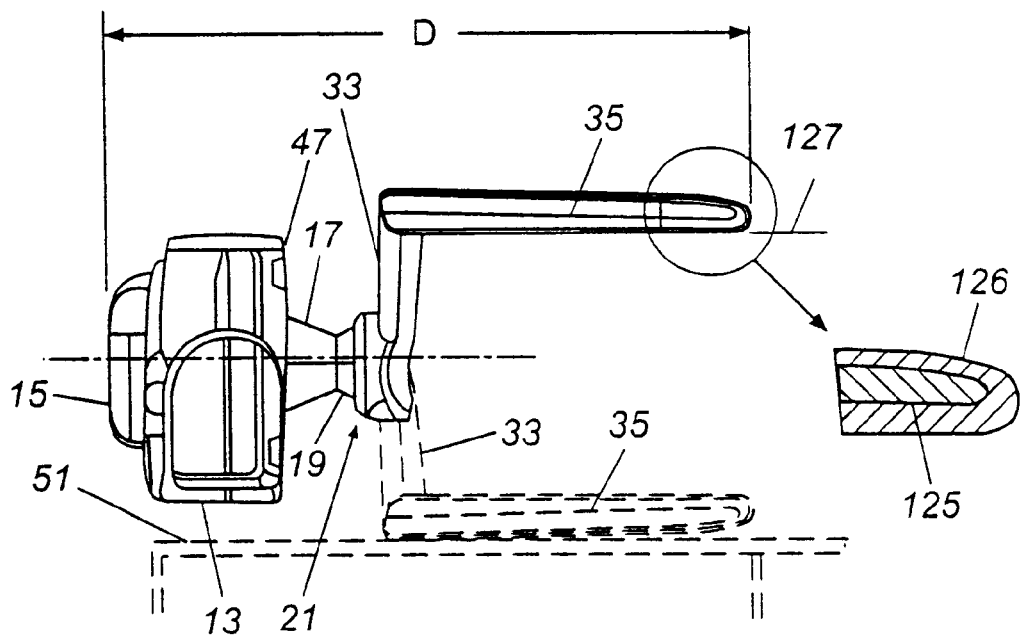
FIG. 4 is a view of the video camera of FIG. 3.

The base 25 comprises a piece of steel sheet metal 0.125" thick over-molded with a non-slip elastomeric material 126 (such as Stantoprene). The base 25 serves as a counter weight to the mass of the camera 11 hanging off the front edge of a monitor surface 127, as shown in FIG. 4.

Figure 5:
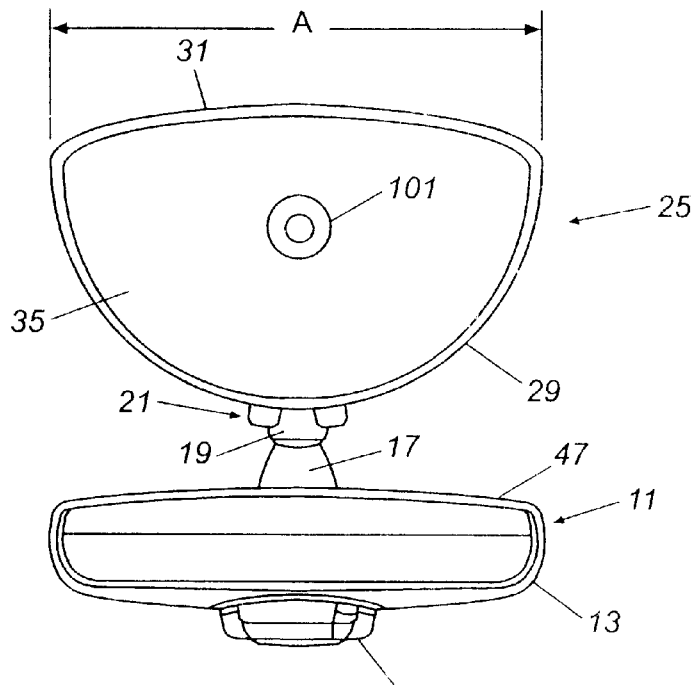
FIG. 5 is a top view of the video camera of FIG. 3.

As seen in FIG. 5, the base 25 includes a horizontal portion 35 having a semi-circular outer perimeter 29 joined by a gently curved rear perimeter 31. An extension arm 33 depends vertically from the horizontal portion 35 of the base 25. This extension arm 33 constitutes a sheet metal portion integrally formed with the sheet metal of the horizontal base portion 35.

The extension arm 33 has a socket 21 formed at one end thereof. The socket member exhibits a circular outer rim 41 with an integrated slot to allow insertion of the cables 43, 45 shown in FIG. 6 (data and microphone cables). The socket 21 is formed in the elastomeric layer 126 surrounding the metal extension arm 33. The socket 21 is created during application of the elastomeric layer 126.

The camera 11 has a tapered horizontal extension 17 extending from the back surface 47 thereof. A hollow ball 19 is formed at the end of the tapered horizontal extension 17. The ball 19 is shaped to insert in ball-and-socket fashion into the socket 21 of the base 25. The ball 19 is preferably molded as part of the plastic body enclosure 13.

The ball-and-socket mechanism 19, 21 thus permits pivotal motion of the camera 11 with respect to the base 25 so as to enable pointing the camera 11 in various desired directions. Tension in the positioning mechanism is controlled by the interference fit between the soft elastomeric base socket 21 and the rigid camera material forming the hollow camera ball 19.

Figure 6:
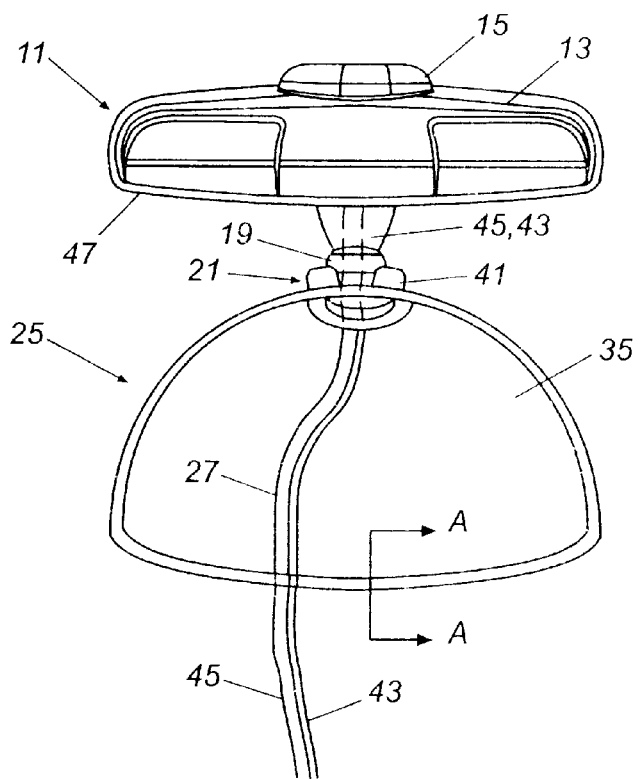
FIG. 6 is a bottom view of the video camera of FIG. 3.

As illustrated in FIG. 6, the undersurface of the horizontal portion of the base 25 includes a molded-in cable routing channel 27. Cable 43, 45 including, for example, a USB data connection and microphone connection are routed through the channel 27 and then through the center of the ball-and-socket joint to the camera 11.

As illustrated by the phantom portion of FIG. 5, the ball-and-socket connection permits a further adjustment feature. In particular, the base 25 may be rotated 180° so as to rest the camera 11 on a table top or other surface 51. A threaded tripod mount insert 101 may further be provided in the sheet metal portion of the top surface of the horizontal portion 35 of the base 25.

The preferred embodiment provides the advantage of permitting movement of the camera lens closer to the center of the monitor screen and the simplicity of the pivot adjustment mechanism. The ball-and-socket design requires no additional hardware for assembly, which minimizes part count and assembly time resulting in lower manufacturing costs. The camera lens is moved closer to the user's eye level thereby improving eye-to-eye contact, while a wide and easily controlled range of motion in the camera angle is provided, thereby permitting various viewing angles. Representative dimensions for the camera FIGS. 3–6 are: A=4.08 inches, B=4.000 inches, C=2.245 inches and D=4.452 inches.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A video teleconference apparatus comprising:
   a base member having a flat base portion and a vertically depending arm, and a socket located on said arm;
   a camera body having a rear surface with a ball member extending therefrom, the ball member being sized to form a ball-and-socket connection with said socket; and
   a metal portion of a weight selected to maintain said apparatus in position when said base member is resting on top of a computer monitor and said arm is depending in front of said monitor, to said base member,
   wherein said arm and base portion are formed from a single piece of sheet metal.

2. The apparatus of claim 1 wherein said camera body is a plastic enclosure and said ball comprises a plastic ball.

3. The apparatus of claim 1 wherein said arm and base portion are covered with an elastomeric material and wherein said socket is formed in said elastomeric material.

4. The apparatus of claim 1 wherein said socket has a circular outer perimeter with a gap therein.

5. A video teleconference apparatus comprising:
   a base member having a flat metal base portion and a vertically depending metal arm, the base portion and arm being covered with an elastomeric materials said elastomeric material being shaped to form a socket on said arm; and
   a camera body having a rear surface with a ball member extending therefrom, said ball member being sized to form a ball-and-socket connection with said socket,
   wherein said flat metal base portion and said vertically depending metal arm are formed from a single piece by bending said single piece such that said metal arm depends vertically from said base portion.

6. The apparatus of claim 5 wherein said base portion includes a metal portion of a weight selected to maintain said apparatus in position when said base members is resting on top of a computer monitor and said arm is depending in front of said monitor.

7. The apparatus claim 5 wherein said camera body is a plastic enclosure and said ball comprises a plastic ball.

8. The apparatus of claim 5 wherein said base portion includes a metal portion of a weight selected to maintain said apparatus in position when said base member is resting on top of a computer monitor and said arm is depending in front of said monitor.

9. The apparatus of claim 7 wherein said socket has a circular outer perimeter with a gap therein.

10. The apparatus of claim 9 wherein said base portion includes a metal portion of a weight selected to maintain said apparatus in position when said base member is resting on top of a computer monitor and said arm is depending in front of said monitor.

11. A system for supporting a camera on a personal computer monitor comprising:
   a camera having at least a body and a lens enclosure, said body is a single molded piece;
   a tapered horizontal extension; and
   a ball mounted on said extension, wherein said body is a single molded piece;
   a base configured to sit on top of said personal computer monitor and further comprising a counterweight configured to hold said system in position on said personal computer monitor; and
   an extension arm having a socket configured to receive said ball, wherein a single piece of sheet metal is bent form said base and said extension arm.

12. The system of claim 11, wherein said extension arm is configured to position said camera below said base.

13. The system of claim 11, wherein said extension arm is configured to position said camera above said base.

* * * * *